Patented Apr. 26, 1938

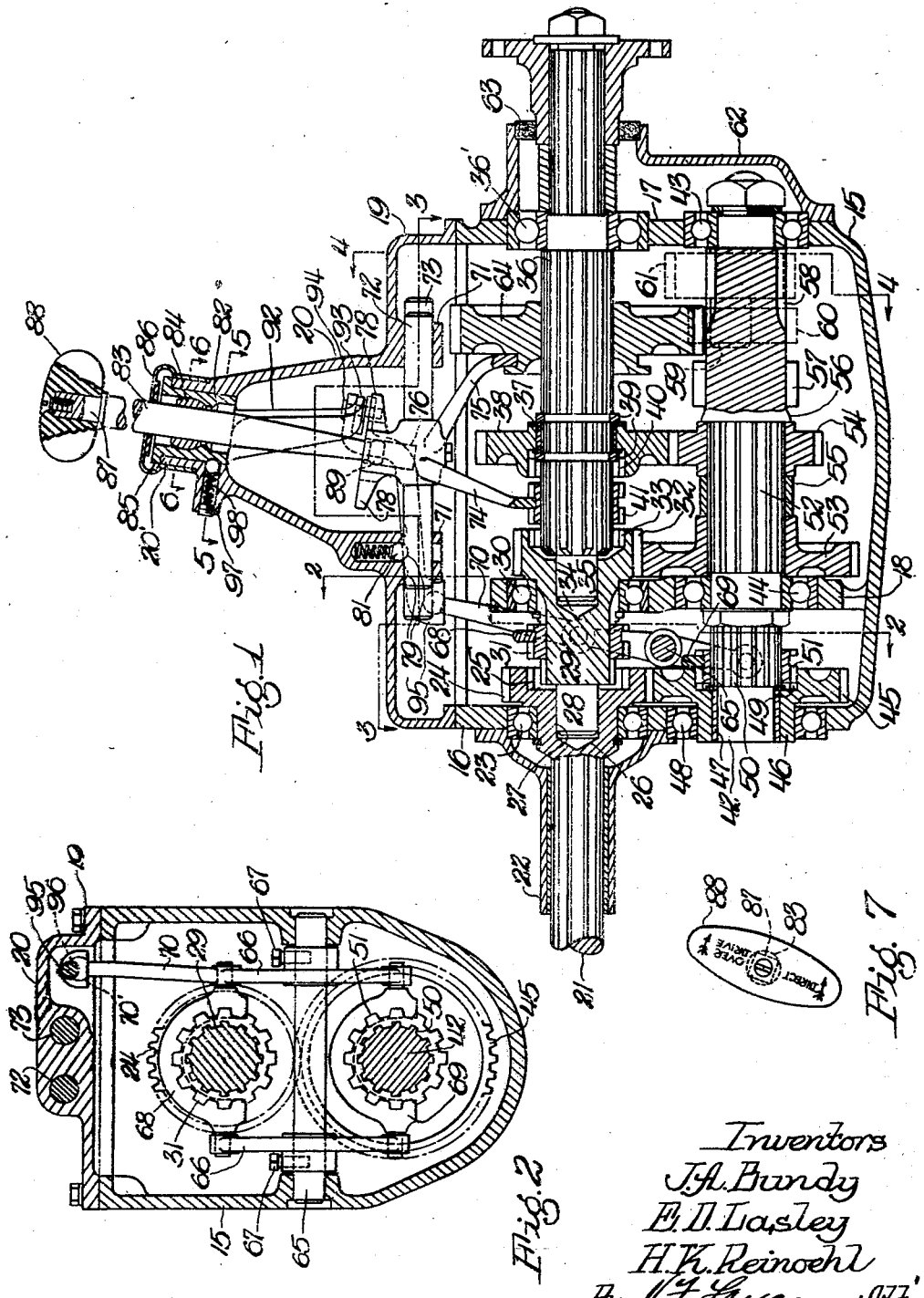

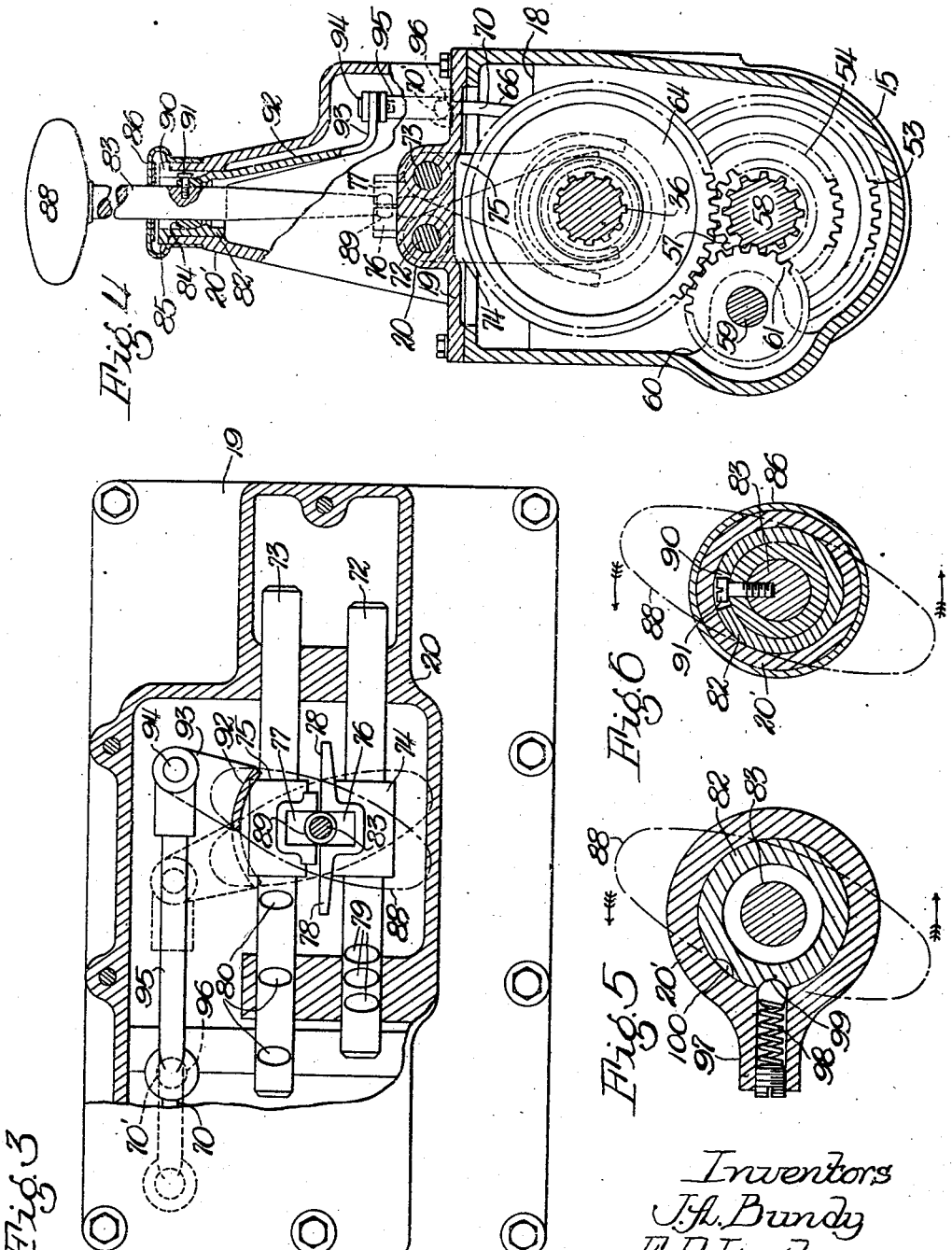

2,115,390

UNITED STATES PATENT OFFICE 2,115,390

TRANSMISSION

Edward D. Lasley, James A. Bundy, and Harry K. Reinoehl, Fort Wayne, Ind., assignors to International Harvester Company, a corporation of New Jersey Application April 18, 1936, Serial No. 75,108

11 Claims. (Cl. 74—473)

This invention relates to a change speed transmission for vehicles and the like, and more particularly, to a transmission of the multiple ratio type having a plurality of transmission mechanisms in which the transmission may be driven through the same set of speed changes in more than one ratio by altering the ratio between the driving shaft and the countershaft.

An important object of the invention is to provide in a transmission a transmission mechanism including disconnectable driving means between the driving shaft and the countershaft capable of altering the ratio between said shafts without materially increasing the number of gears and movable parts in the transmission.

Another important object is to provide a single control means for actuating both transmission mechanisms; in short, for actuating the disconnectable driving means to alter the ratio between the driving shaft and the countershaft and for actuating the transmission gears through their various speed changes.

Another object is to provide in a transmission a construction which is particularly adapted to the use of constant mesh helical gears, thus providing a silent, smooth running transmission and facilitating gear shifting.

Still another object is to provide a transmission having an increased number of speed changes in a plurality of ratios without the increase in controls and gears usually attendant to multiple ratio transmissions.

Still another object is to provide a transmission with a dual ratio drive in which the overdrive ratio may be employed as a cruising range for light loads and long runs resulting in greater speeds and fuel economy.

Other objects and advantages will appear from the following description of the drawings of the invention in which:

Figure 1 is a longitudinal vertical section through the transmission embodying the features of the invention;

Figure 2 is a transverse vertical section through the transmission taken on the line 2—2 of Figure 1 and looking in the direction of the arrows, showing the means interconnecting the disconnectable driving means of one transmission mechanism on the driving shaft and the countershaft;

Figure 3 is a horizontal section through the transmission as viewed downwardly along the line 3—3 of Figure 1, and showing the two positions of the control lever handle;

Figure 4 is a transverse vertical section of the transmission as viewed along the line 4—4 of Figure 1, showing the control lever and shifting means thereon, and also the reverse idler gear;

Figure 5 is a horizontal section through the control lever housing, as viewed along the line 5—5 of Figure 1, showing the detent mechanism employed in locking the control lever in the two ratio positions;

Figure 6 is a horizontal sectional view through the control lever housing as viewed along the line 6—6 of Figure 1, showing the connection between the control lever and the ratio-shifting arm; and, Figure 7 is a top plan view of the control lever handle, showing the ratios indicated by arrows on the handle.

The transmission shown in the drawing is of the type having three speeds forward and one speed reverse in two ratios. The transmission, therefore, will be referred to as a six-speed, dual ratio transmission. In the case of the present invention, the two ratios are direct drive and overdrive; that is, direct drive is the conventional ratio and the transmission may be operated through its range of three speeds forward and one speed reverse, and the overdrive is an auxiliary or higher ratio, and the transmission may be operated through a higher range of three speeds forward and one speed reverse, the same gears, gear changes, and control means being employed in both ratios.

The transmission, as best shown in Figures 1, 2, and 4, is shown with the disconnectable driving means in overdrive position and comprises a housing 15 including a front wall 16, a rear wall 17, and an intermediate wall 18. The transmission housing 10 is open at its top side and is fitted with a cover 19, which includes the control lever housing 20 extending centrally and longitudinally of the cover 19.

Journaled in the front wall 16 of the housing 15 is the driving shaft 21. This shaft is driven from the power plant through a clutch, as is conventional, and is further supported at the front end of the housing 15 by a bearing sleeve 22 secured to the front wall 16 of the housing. An antifriction bearing 23 in the front wall 16 insures a smooth running bearing for the shaft 21.

At its rear end behind the bearing 23, the driving shaft 21 is provided with an enlarged portion which carries a gear 24, said gear in this invention being formed integral with the shaft 21 and cut out from the enlarged portion thereof. The enlarged portion is further cut out inwardly concentrically with respect to the shaft 21 and the gear 24 to form an internal clutch member 25, which is part of a disconnectable driving means of a transmission mechanism later to be described.

The driving shaft 21 is bored axially, as at 26, to provide a pilot bearing 27 into which is journaled the reduced end 28 of a second shaft 29 in axial alignment with the driving shaft 21. This second shaft 29 is journaled adjacent its rearward end on an antifriction bearing 30 mounted in the intermediate wall 18. The portion of the shaft 29 between the gear 24 and the intermediate wall 18 is splined, and carries slidably and non-rotatably thereon a clutch member 31 which forms with the clutch member 25 a disconnectable driving means between the driving shaft 21 and the second shaft 29.

Rearward of the intermediate wall, the shaft 29 includes an enlarged portion which carries a gear 32, similar to the gear 24, the gear 32 in this invention being formed as an integral portion of the shaft 29. Concentrically cut out of the enlarged portion of the shaft 29 is an internal clutch member 33, similar to the clutch member 25 in the enlarged portion of the driving shaft 21. The clutch member 33 forms part of a second disconnectable driving means later to be described.

The shaft 29 at its rearward end is bored axially, as at 34, to provide a pilot bearing in which is journaled in axial alignment with the shafts 21 and 29, the reduced end 35 of the driven shaft 36.

The shaft 36 is journaled at its rear end in an antifriction bearing 36' in the rear wall 17 of the housing 15, and extends through the rear wall where it is available for connection to the usual propeller shaft, which is conventional construction.

Between the gear 32 and the rear wall 17 of the transmission housing 15, the driven shaft 36 includes a splined portion substantially midway between the ends of which is rotatably carried on a bearing housing 37, the second speed driven shaft gear 38. The gear 38 is prevented against sliding movement on the shaft 36 by the lock rings 39. At its forward end the gear 38 is cut out concentrically to form an internal clutch member 40, similar to the recessed gears 25 and 33, said clutch member 40 being part of a disconnectable driving means of a second transmission mechanism between the shafts 29 and 36 and between the shaft 36 and the gear 38.

Slidably and non-rotatably mounted on the splined portion of the shaft 36 and between the clutch members 33 and 40 is a clutch member 41 similar to the clutch member 31. The clutch member 41 and the clutch members 33 and 40 establish the complete second disconnectable driving means. It will be noted that the shaft 21 can rotate without rotating the shaft 29 except when the clutch member 31 on the shaft 29 is engaged with the clutch member 25 in the driving shaft 21. Further, it will be noted that the shafts 29 and 36 are independently rotatable with respect to each other except when the clutch member 41 on the shaft 36 engages the clutch member 33 in the second shaft 29. It will be still further noted that the gear 38 is independently rotatable on the shaft 36 except when the clutch member 41 on the shaft 36 is engaged with the clutch member 40 in the gear 38.

Disposed parallel to and below the driving shaft 21, the second shaft 29, and the driven shaft 36, is the countershaft 42. At its rearward end the countershaft 42 is journaled in an antifriction bearing 43 in the rear wall 17 of the housing 15, and near its forward end is journaled in the intermediate wall 18 in an antifriction bearing 44.

At its forward end the countershaft 42 carries, independently rotatable thereon, a gear 45 which is in constant mesh with the gear 24 on the driving shaft 21. The gear 45 is provided with a forwardly extending sleeve portion 46, which is carried on a bearing bushing 47 on the countershaft 42 and in an antifriction bearing 48 in the front wall 16 of the housing 15. At its rearward end, the gear 45 is formed with a concentric cutout to provide an internal clutch member 49 similar to the clutch members 25, 33 and 40. The clutch member 49 forms part of a third disconnectable driving means and part of the first transmission mechanism in the transmission which will be later described.

The countershaft 42, between the gear 45 and the intermediate wall 18, is provided with a splined portion 50, on which is slidably and non-rotatably carried a clutch member 51. The clutch member 51 is similar to the clutch members 31 and 41, and forms with the clutch member 49 in the gear 45, the third disconnectable driving means. It will be noted, upon examination of Figure 1, that the gear 45 on the countershaft 42 is in constant mesh or driving engagement with the gear 24 on the driving shaft, and, as further shown in Figure 1, the clutch member 51 is in overdrive position; that is, in driving engagement with the clutch member 49 in the gear 45, thus establishing driving engagement between the driving shaft 21 and the countershaft 42. It is apparent, however, that, when the clutch member 51 is released from driving engagement with the clutch member 49 in the gear 45, the gear 46 and the countershaft 42 are independently rotatable with respect to each other.

Extending rearwardly from the intermediate wall 18, the countershaft 42 is provided with a second splined portion 52, which extends substantially midway between the rear and intermediate walls 17 and 18. Non-rotatably carried on this splined portion 52 of the countershaft 42 and non-slidably axially thereon are the third speed countershaft gear 53 and the second speed countershaft gear 54. These gears 53 and 54 are axially spaced on the splined portion 52 by the countershaft gear spacer 55, and are in constant mesh or driving engagement with the gear 32 on the second shaft 29 and the gear 38 on the driven shaft 36, respectively, and comprise part of the second transmission mechanism. It will be noted that the gears 32 and 38 and the gears 53 and 54 cannot be displaced axially. In the present invention, helical gears are employed to insure quiet and smooth operation. The gear 24 on the driving shaft 21 and the gear 45 on the countershaft are also helical gears, although it is obvious that ordinary or specially cut gears may be used in place of the gears 24, 32, 38, 45, 53, and 54 without departing from the scope of the invention.

Rearward of the second speed countershaft gear 54 on the splined portion 52 of the countershaft 42, the countershaft is formed with an annular enlarged portion 56, which further acts to prevent axial displacement of the countershaft gears 53 and 54.

Rearwardly of this annular enlarged portion 56, the countershaft carries the low speed countershaft gear 57, preferably formed, as in the case of the present invention, as an integral portion of the countershaft 42.

Rearward of the low speed countershaft gear 57, the countershaft 42 carries the reverse countershaft gear 58, preferably cut out as an integral portion of the countershaft. As indicated in dotted lines in Figure 1 and, as best shown in Figure 4, the reverse idler shaft 59 is disposed parallel to the countershaft and is journaled at its rearward end in the rear wall 17 of the housing 15 and at its forward end in a supplemental wall extension 60 formed as part of the housing 15. The reverse idler shaft 59 carries rigidly therewith the reverse idler gear 61, which is in constant mesh or driving engagement with the reverse countershaft gear 58. A supplemental bearing cover 62 further encloses the rear wall 17 of the transmission housing 15 and is formed to surround the shaft 36 and the component parts associated therewith with an oil tight seal 63, all of which may be of conventional construction.

Non-rotatably carried by the shaft 36 and axially slidable on the splined portion thereof is the low and reverse speed driven shaft gear 64. Normally positioned on the shaft 36 between the rear wall 17 and the second speed driven shaft gear 38, the low speed driven shaft gear 64 is slidable forward and rearward to mesh for driving engagement with the low speed countershaft gear 57 and the reverse idler gear 61, respectively.

It will now be apparent that operable means have been provided for driving the transmission gearing and the first disconnectable driving means 25, 31 may be connected to establish driving engagement between the driving shaft 21 and the second shaft 29; the second disconnectable driving means 33, 40, 41 may be connected to establish driving engagement between the second shaft 29 and the driven shaft 36, or between the shaft 36 and the gear 38; the third disconnectable driving means 45, 49, 51 may be connected to establish driving engagement between the gear 45 and the countershaft 42, which is, of course, driving engagement between the driving shaft 21 and the countershaft 42, as the gear 45 is in constant mesh with the gear 24 on the driving shaft 21; and the low and reverse speed driven shaft gear may be shifted to establish driving engagement in low and reverse speeds between the countershaft 42 and the driven shaft 36.

The description of the disconnectable driving means and the gearing of the two transmission mechanisms of the transmission being completed, the control means will be described.

As best shown in Figures 1 and 2, a rockshaft 65 is journaled at each end in opposite sides of the housing 15 and is disposed substantially midway between the second shaft 29 and the countershaft 42 and between the front and intermediate walls 16 and 18 of the housing. Mounted on the rockshaft 65 for movement therewith are the spaced members 66.

These members 66 are positioned on the rockshaft 65 on either side of the clutch members 31 and 51 and are rigidly secured to the rockshaft by set screws 67, and form interconnecting means extending substantially upwardly and downwardly from the rockshaft 65 to approximately the center of the second shaft 29 and the countershaft 42. At these points there are journaled in the spaced members 66, upper and lower shifting yoke members 68 and 69. The upper shifting yoke member 68 engages an annular recess in the clutch member 31 on the second shaft and the lower shifting yoke member engages an annular recess in the clutch member 51 on the splined portion 50 of the countershaft 42. It will be apparent from an examination of Figures 1 and 2 that the clutch members 31 and 51 are interconnected for shifting movement in opposite directions; that is, when the clutch member 31 is shifted forward on the second shaft 29 and is engaged with the clutch member 25 in the driving shaft 21, the clutch member 51 on the countershaft is shifted rearwardly and is disengaged from the clutch member 49 in the gear 45. In short, when the first disconnectable driving means 25, 31 is connected to establish driving engagement between the driving shaft 21 and the second shaft 29, the third disconnectable driving means 45, 49, 51 is disconnected from driving engagement, and vice versa. Thus an independent operating means for the first transmission mechanism has been provided.

In the case of the present invention, one of the spaced members 66 of the interconnecting means between the first and third disconnectable driving means is provided with an upwardly projecting extension 70 provided with an end formed as a ball 70' for a purpose to appear presently.

As previously described the transmission housing 15 is fitted at its top side with a cover 19, which is provided with the control lever housing 20. The cover 19 is formed with integral downwardly extending portions 71, as best shown in Figures 1, 3, and 4, and which provide bearings to carry the second and high speed shifting rod 72 and the low and reverse shifting rod 73.

At a position midway between the bearing portions 71, the second and high shifting rod 72 rigidly carries the second and high speed shifting fork 74, which engages an annular recess in the clutch member 41. Opposite the upper end of the shifter fork 74, the low and reverse speed shifting rod 73 rigidly carries the low and reverse speed shifter fork 75, which engages the annular recess in the low and reverse driven shaft gear 64.

The shifter forks 74 and 75 are of conventional construction and are provided at their points of connection with the shifting rods 72 and 73 with enlarged portions formed with notches 76 and 77, respectively. The shifter forks 74 and 75 are secured to the shifting rods 72 and 73, respectively, by set screws, and the shifter fork 74 is further provided with flanged wing portions 78 for a purpose to appear later, and comprise independent operating means for the second transmission mechanism.

It is understood that the shifting rods 72 and 73 are slidable forwardly and rearwardly in the bearing portions 71 of the cover 19 and carry the shifter forks 74 and 75 therewith. At its forward end the shifting rod 72 is provided with the usual detent notches 79 and the shifting rod 73, with detent notches 80. The usual detent locking mechanisms for holding the shifting rod in position are provided, only one of which is shown at 81 in Figure 1.

In the transmission shown in the drawings of the present invention, the control lever housing is formed as a truncated conical extension of the cover 19 and is formed at its upper end with a cylindrical extension 20' in which is carried in a sleeve 82 rotatable in the control lever housing extension 20', the control lever 83 mounted on the usual ball joint 84 in the sleeve 82. The sleeve 82 is prevented from movement axially downward by an annular flange 85 formed at the upper end thereof. A dust cap 86 encloses the upper cylindrical end 20' of the control lever housing 20 around the control lever 83. The control lever 83 extends upwardly and is provided with a square shank portion 87, on which is secured for rotation therewith a knob or handle 88.

Below the ball joint 84 in the sleeve 82, the lever 83 extends downwardly, and, as best shown in Figures 1 and 3, is provided at its lower end with a ball 89, which is adapted to engage either of the notches 76 or 77 in the shifter forks 74 and 75, providing means on the control lever to engage the independent operating means for the second transmission mechanism. From the above description, it will be apparent that the control lever 83 may be rocked about the ball 84 in the sleeve 82 to engage and shift either of the shifter forks 74 and 75 forwardly or rearwardly, thus shifting the clutch member 41 on the driven shaft 36 into driving engagement with either the clutch member 33 in the second shaft 29 or into driving engagement with the clutch member 40 in the second speed driven shaft gear 38 on the shaft 36; or, thus shifting the low and reverse speed gear 64 into driving engagement with either the low-speed countershaft gear 57 or the reverse idler gear 61. The wing portions 78 on the shifter fork 74 prevent escape of the lower end of the control lever 83 when the forks 74 and 75 are moved out of alignment with each other.

The sleeve 82, as best shown in Figures 4 and 6, is provided with a slot 90. A pin or bolt 91 is secured in the control lever 83 and extends through the ball 84 into the slot 90 in the sleeve 82. By this means the sleeve 82 is rotatable with the control lever 83, and at the same time rockable therein about the ball 84, for a purpose later to be described.

Formed integral with the sleeve and extending downwardly and outwardly therefrom is the shifting arm 92, as best shown in Figures 1, 3, and 4. The lower end of the shifting arm 92 is turned outward, as at 93, at a point substantially in line with the lower end of the control lever 83, and has pivotally connected thereto by a pin 94, the shifting link 95, providing means on the control lever to engage the independent operating means for the first transmission mechanism, as best shown in Figures 1 and 3. At its forward end the shifting link 95 is enlarged and is provided with a socket joint 96. The socket joint 96 in the shifting link 95 is fitted over the ball 70' on the extension 70 of the member 66, as previously described, and forms a pivotal joint therewith. By this means a connection is established between the spaced members or interconnecting means 66 and the shifting arm 92, which shifting arm 92 has further connection with the control lever 83. It will be apparent from an examination of Figure 3 that, when the control lever 83 is rotated about its own axis, the shifting arm 92 is carried therewith through the connection 90, 91 between the two, and the shifting link 95 is shifted accordingly to actuate the spaced members 66 and the shifting yoke members 68 and 69, which in turn actuate the clutch members 31 and 51.

As best shown in Figures 1 and 5, the control lever housing extension 20' is provided near its upper end with an integral projecting portion 97, which carries a detent locking mechanism 98.

As the sleeve 82 and shifting arm 92 are rotatable about their axis from overdrive to direct, a means is necessary to hold them in each position. For this purpose a pair of notches 99 and 100 are provided in the sleeve 82, which notches are adapted to be engaged by the detent mechanism 98. When the notch 99 in the sleeve 82 is engaged by the detent mechanism, as shown in Figure 5, the transmission is in overdrive position, as shown in the drawings. And, when the notch 100 is engaged by the detent mechanism 98, the transmission is in direct drive, the rotation of the handle 88, the control lever 83, the sleeve 82, and the shifting arm 92 being indicated in the dotted position in Figure 3, and the direction of rotation of said parts being indicated by the arrows in Figures 5, 6, and 7.

It is apparent from the above description of the parts of the transmission disclosed that a dual ratio transmission is provided in which either ratio is under optional control of the operator by merely rotating or twisting the handle or knob 88 on the control lever 83.

When the transmission, as shown in the drawings, is in overdrive position, the first disconnectable driving means 25, 31 is disconnected; that is, the clutch member 31 is out of driving engagement with the clutch member 25 in the driving shaft 21. And, because of the interconnection between the first disconnectable driving means 25, 31 by means of the spaced members 66 and the rockshaft 65, the third disconnectable driving means 45, 49, 51 is connected or in driving engagement.

When it is desirable to operate the transmission in overdrive ratio, the handle 88 on the control lever is turned to overdrive position, to operate the first transmission mechanism, as shown in all of the figures of the drawings, the direction of rotation being indicated by instructions on the handle 88, as shown in Figure 7. In this position (Figure 1), the clutch member 51 on the splined portion 50 of the countershaft 42 engages the clutch member 49 in the gear 45 on the countershaft 42 and the countershaft 42 is driven through the gears 45 and 24 by the driving shaft 21, which is operated by the power plant (not shown) connected thereto. It is obvious, of course, that the clutch member 31 on the second shaft 29 is simultaneously disengaged from the clutch member 25 in the driving shaft 21, and there is no driving engagement between the two shafts.

The countershaft now being driven by the driving shaft 21 through the gear 24 and through the third disconnectible driving means 45, 49, 51,—the third and second speed countershaft gears 53 and 54, respectively, are rotated therewith; the third speed countershaft gear 53 drives the gear 32 on the second shaft 29, and the second speed countershaft gear drives the second speed driven shaft gear 38, the gears 53 and 32 and the gears 54 and 38 being in constant mesh, as previously stated. The reverse idler gear 61 is driven by the reverse countershaft gear 58, both gears being in constant mesh.

Then to shift the transmission into overdrive reverse speed operation, the control lever 83 is moved to the left from its neutral position (looking at Figures 1 and 4) and forward, shifting the shifting rod 73 and shifter fork 75 rearward, operating the second transmission mechanism, and sliding the low and reverse speed driven shaft gear 64 rearward on the shaft 36 into driving engagement with the reverse gear 61. The shaft 36 is then driven in overdrive reverse. Meanwhile, the angular position of the control lever 83 remains unchanged in the overdrive position with the detent mechanism 98 still engaging the overdrive notch 99 in the sleeve 82.

To operate the transmission in overdrive low speed, the control lever 83 is moved rearwardly from the reverse position to the neutral position shown in Figures 1 and 3, not disturbing its angular position, and is moved to the left (looking to Figures 1 and 4) and rearwardly, shifting the shifting rod 73 and the shifter fork 75 forward and sliding the low and reverse speed countershaft gear 64 into driving engagement with the low speed countershaft gear 57, thus driving the shaft 36 forward at a low speed.

To operate the transmission in overdrive second speed, the control lever 83 is returned to its neutral position without disturbing its angular position, and moved to the right and forwardly (looking again to Figures 1 and 4) thus sliding the shifting rod 72 and the shifter fork 74 rearwardly and shifting the clutch member 41 on the driving shaft 36 into driving engagement with the second speed driven shaft gear 38. The gear 38 has been in constant driving engagement with the second speed countershaft gear 54 and driving engagement is established between the driven shaft 36 and the countershaft 42 through the gears 54 and 38 and the clutch member 41 and the clutch member 40 in the gear 38, rotating the driven shaft 36 at an intermediate or second speed or at a speed higher than low speed.

To operate the transmission in overdrive high speed, the control level 83 is returned to its neutral position, not disturbing its angular position, and is moved to the right and rearwardly, thus shifting the shifting rod 72 and the shifter fork 74 forwardly and sliding the clutch member 41 on the driven shaft 36 into driving engagement with the recessed gear 33 in the second shaft 29, which second shaft is driven by the countershaft 42 through the high or third speed countershaft gear 53 and the gear 32 on the shaft 29 always in driving engagement. The driving shaft 36 is then operated in a forwardly rotating direction at the highest possible speed from the transmission. Third speed in the overdrive ratio, then, is through the driving shaft 21, through the gears 24 and 45, through the third disconnectible driving means 45, 49, 51, through the countershaft 42, through the gears 53 and 32, and through the second disconnectible driving means 33, 41 to the driven shaft 36.

To operate the transmission in direct drive ratio, the control lever handle 88 and control lever 83 are turned in the direction of the arrow (Figure 7) on the side of the handle marked direct, the direction also being indicated by arrows in Figures 5 and 6, and by dotted line position of the handle 88 in Figure 3. Turning the control lever 83 in the direction indicated toward direct drive position carries the shifting arm 92 and the sleeve 82 thereon in a counterclockwise direction until the direct drive notch 100 in the sleeve 82 is engaged by the detent mechanism 98 in the control lever housing extension 20'.

The first disconnectible driving means 25, 31 is engaged as the shifting arm 92 moves the shifting link 95 in a forward direction, thus actuating the spaced members or interconnecting means 66 and shifting the yokes 68 and 69 to move the clutch member 31 on the second shaft 29 into driving engagement with the clutch member 25 in the driving shaft 21, and to move the clutch member 51 on the splined portion 50 of the countershaft 42 out of driving engagement with the clutch member 49 in the gear 45, thus disconnecting the third disconnectible driving means 45, 49, 51. The driving engagement between the driving shaft 21 and the countershaft 42 in direct drive is established through the first disconnectible driving means 25, 31, through the second shaft 29 and through the gear 32 thereon, which is in constant mesh with the third speed countershaft gear 53, splined to the splined portion 52 of the countershaft 42.

It will be apparent from an examination of Figure 1 that the countershaft 42 is driven at a higher rate of speed in overdrive ratio than in direct, because of the relative ratios between the gears 24 and 45 and between the gears 32 and 53.

To shift the transmission through the various speeds, reverse, low, second, and high, the control lever 83 is moved exactly the same as in overdrive position and assumes exactly the same positions in corresponding speeds. However, it is understood that the control lever 83 has been rotated to direct drive position and the angular position of the control lever 83 remains unchanged while shifting. It will also be understood that each speed in direct drive is relatively slower than the corresponding speeds in overdrive because of the difference in the ratios between the driving shaft 21 and the countershaft 42. The driving engagement between the driving shaft 21 and the driven shaft 36 in direct drive is straight through from the shaft 21, through the first disconnectable driving means 25, 31, through the shaft 29, and through the second disconnectable driving means 33, 41 to the driven shaft 36.

The speed of the transmission may be changed from direct to overdrive and from overdrive to direct at any time during speed changes by rotation of the handle 88 on the control lever 83 in the direction indicated for the drive or ratio desired.

The overdrive speeds have particular advantages when the vehicle in which the transmission is mounted is to be operated over long, smooth stretches when the load thereon is light. Obviously, of course, the direct drive speeds in the transmission may be used to excellent advantage in the disposition of heavy loads or difficult pulls.

The above description and operation of the transmission disclosed refer to a preferable embodiment of the invention, and it is obvious from the multiplicity of possible alterations apparent in the structure of transmissions that numerous other transmissions of the same type may be constructed without departing from the scope of the invention.

It will also be understood that any of the gearing may be altered to convert the disclosed transmission into a direct drive-underdrive ratio transmission by changing the overdrive ratio, which is lower than the direct drive ratio, to an underdrive ratio, which would manifestly be higher than the direct drive ratio.

What is claimed is:

1. The combination with a transmission housing comprising a plurality of transmission mechanisms and independent operating means to effect the operation of each, of a sleeve carried in the housing, a single control lever rockably carried in the sleeve and turnable therewith, means on the lever to engage one of the independent operating means, and means on the sleeve to engage another of the independent operating means.

2. The combination with a transmission housing comprising a plurality of transmission mechanisms and independent operating means to effect the operation of each, of a sleeve carried in the housing, an arm on the sleeve, a single control lever rockably carried in the sleeve and turnable therewith, means on the lever to engage one of the independent operating means, and means on the arm to engage another of the independent operating means.

3. The combination with a transmission housing comprising a transmission mechanism including a pair of disconnectable driving means, a rockshaft and operating means carried thereby for simultaneously operating said pair of disconnectable driving means, a second transmission mechanism and independent operating means to effect the operation thereof, of a single control lever carried by the housing rockable therein and turnable about its axis, means associated with the control lever for actuating the first operating means upon angular movement of the control lever, and a second means associated with the control lever for actuating the second operating means upon rocking movement of the control lever.

4. The combination with a transmission housing comprising a transmission mechanism including a pair of disconnectable driving means, a rockshaft and operating means carried thereby for simultaneously operating said pair of disconnectable driving means, a second transmission mechanism and independent operating means to effect the operation thereof, of a sleeve carried by the housing, a single control lever carried by the sleeve rockable therein and turnable therewith about its axis, means on the sleeve for engaging the first operating means upon angular movement of the control lever, and a second means on the control lever for engaging the second operating means upon rocking movement of the control lever.

5. The combination with a transmission comprising a housing and a plurality of transmission mechanisms, operating means to effect the operation of one of the transmission mechanisms, of a rockshaft carried by the housing, operating means carried on said rockshaft to effect the operation of another transmission mechanism, a single control lever carried in the housing, and interconnecting means between the lever and the operating means on the rockshaft, said control lever being rockable therein to engage said first operating means and angularly movable about its axis to engage the interconnecting means to actuate the operating means on the rockshaft.

6. The combination with a transmission comprising a housing and a plurality of transmission mechanisms, operating means to effect the operation of one of the transmission mechanisms, of a rockshaft carried by the housing, operating means carried on said rockshaft to effect the operation of another transmission mechanism, a sleeve carried by the housing, interconnecting means between the sleeve and said second means, a single control lever carried by the sleeve rockable therein to engage said first operating means and turnable therewith to move the interconnecting means to engage the operating means on the rockshaft.

7. The combination with a transmission comprising a housing and a plurality of transmission mechanisms, operating means to effect the operation of one of the transmission mechanisms, of a rockshaft carried by the housing, operating means carried on said rockshaft to effect the operation of another transmission mechanism, a sleeve carried by the housing, an arm on the sleeve, interconnecting means connected between said arm and the second means, and a single control lever carried by the sleeve and turnable therewith to move the arm and interconnecting means to engage the operating means on the rockshaft, said control lever being rockable in the sleeve to engage the first operating means.

8. The combination with a transmission comprising a housing, a transmission mechanism including a pair of disconnectable driving means, a rockshaft, and operating means carried thereby for simultaneously operating said pair of disconnectable driving means and a second transmission mechanism and independent operating means to effect the operation thereof, a sleeve carried in the housing, of a single control lever rockably carried by the sleeve and turnable therewith, means on the sleeve for engaging the first operating means upon angular movement of the control lever, and means on the control lever for engaging the second operating means upon rocking movement of the control lever.

9. The combination with a transmission comprising a housing and a plurality of transmission mechanisms and independent operating means to effect the operation of each, of a sleeve carried in the housing, a ball mounted in the sleeve, a single control lever carried by the ball, said control lever being rockable in the sleeve and turnable therewith, means on the lever to engage one of the independent operating means, means on the sleeve to engage another of the independent operating means, and detent means between the sleeve and the housing for locking the sleeve and control lever in an angular position.

10. The combination with a transmission comprising a housing and a plurality of transmission mechanisms and independent operating means to effect the operation of each, of a sleeve carried in the housing, a single control lever carried in the sleeve rockable therein and turnable therewith, an arm on the sleeve, a link operably connecting the arm with one of the independent operating means, and means on the lever to engage another of the independent operating means.

11. The combination with a transmission comprising a housing and a plurality of transmission mechanisms and independent operating means to effect the operation of each, a sleeve carried in the housing, of a single control lever carried in the sleeve rockable therein and turnable therewith, detent means between the housing and the sleeve, means on the lever to engage one of the independent operating means, and means on the sleeve to engage another of the independent operating means.

EDWARD D. LASLEY.
JAMES A. BUNDY.
HARRY K. REINOEHL.